May 30, 1933.  C. S. JENNINGS ET AL  1,912,144
VERTICAL CONVEYER
Filed March 3, 1930   3 Sheets-Sheet 3
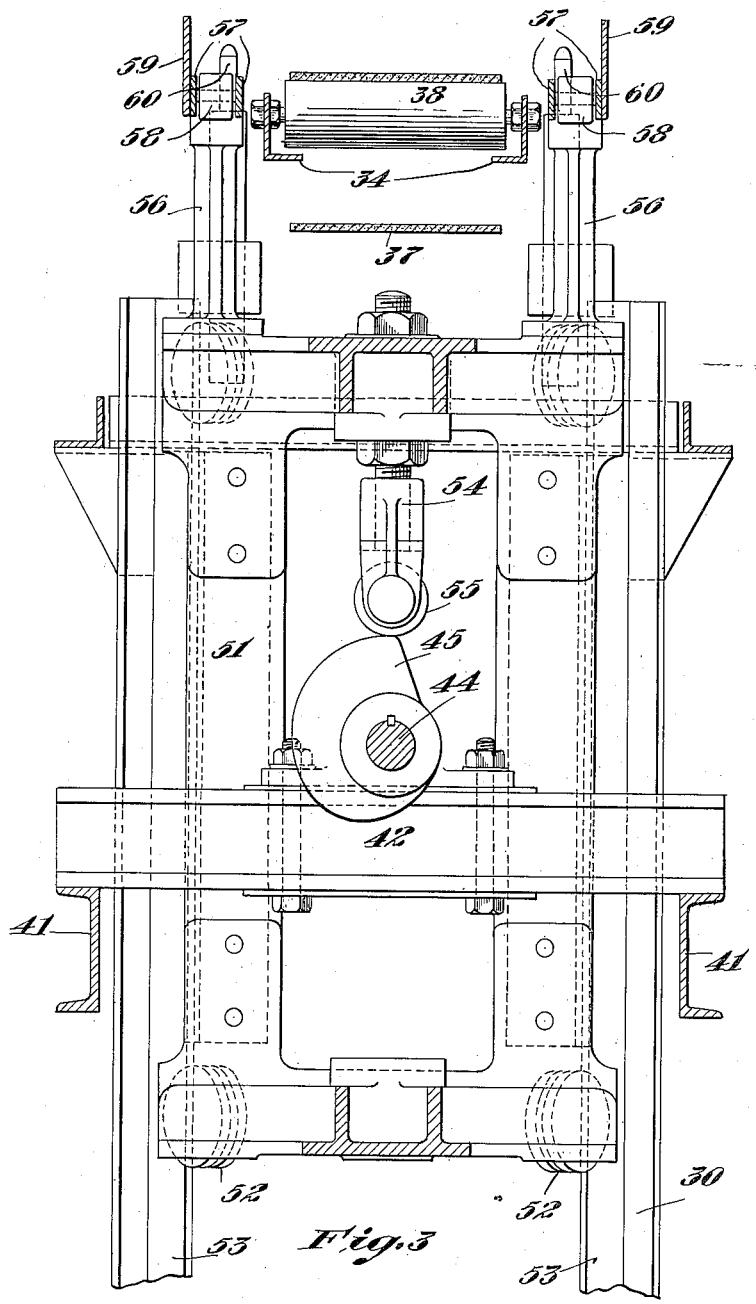
Inventors
Chester S. Jennings
Charles R. Libby
by Roberts, Cushman & Woodberry
Attorneys Patented May 30, 1933

1,912,144

UNITED STATES PATENT OFFICE

CHESTER S. JENNINGS AND CHARLES R. LIBBY, OF SYRACUSE, NEW YORK, ASSIGNORS TO THE LAMSON COMPANY, OF SYRACUSE, NEW YORK, A CORPORATION OF MASSACHUSETTS

VERTICAL CONVEYER

Application filed March 3, 1930. Serial No. 432,666.

This invention relates to an improvement in a vertical conveyer and more particularly in a continually moving conveyer in which the load is supplied to the conveyer at one station and is delivered therefrom at another station during its upward travel.

One object of this invention is to provide a vertical conveyer comprising belts, chains or similar traveling means on which are supported suitably spaced carriers by which the loads are transported from one station to another during the upward travel of the conveyer in combination with means for supplying a load thereto and means for removing the load therefrom, both said means being automatically controlled by the conveyer operating means.

A further object of the invention is to provide at the loading station of the conveyer means for feeding the load into engagement with a stop and means for separating the load and the stop whereupon the load is advanced into a position from which it is removed by the carriers on the vertical conveyer.

A further object of the invention is to provide, at the loading station mechanism comprising a travelling carrier and a platform movable by the conveyer operating means in timed relation with the conveyer, which platform carries stops which, when the platform is in one position are engaged by the loads and, when the platform is in another position, release the loads so that they are advanced by the traveling carrier, the first load being advanced into the proper position for loading.

Other objects will appear from a consideration of the following specification and the drawings which form a part thereof and in which;

Fig. 3 is a sectional side elevation of the mechanism at the loading station.

Figure 1:
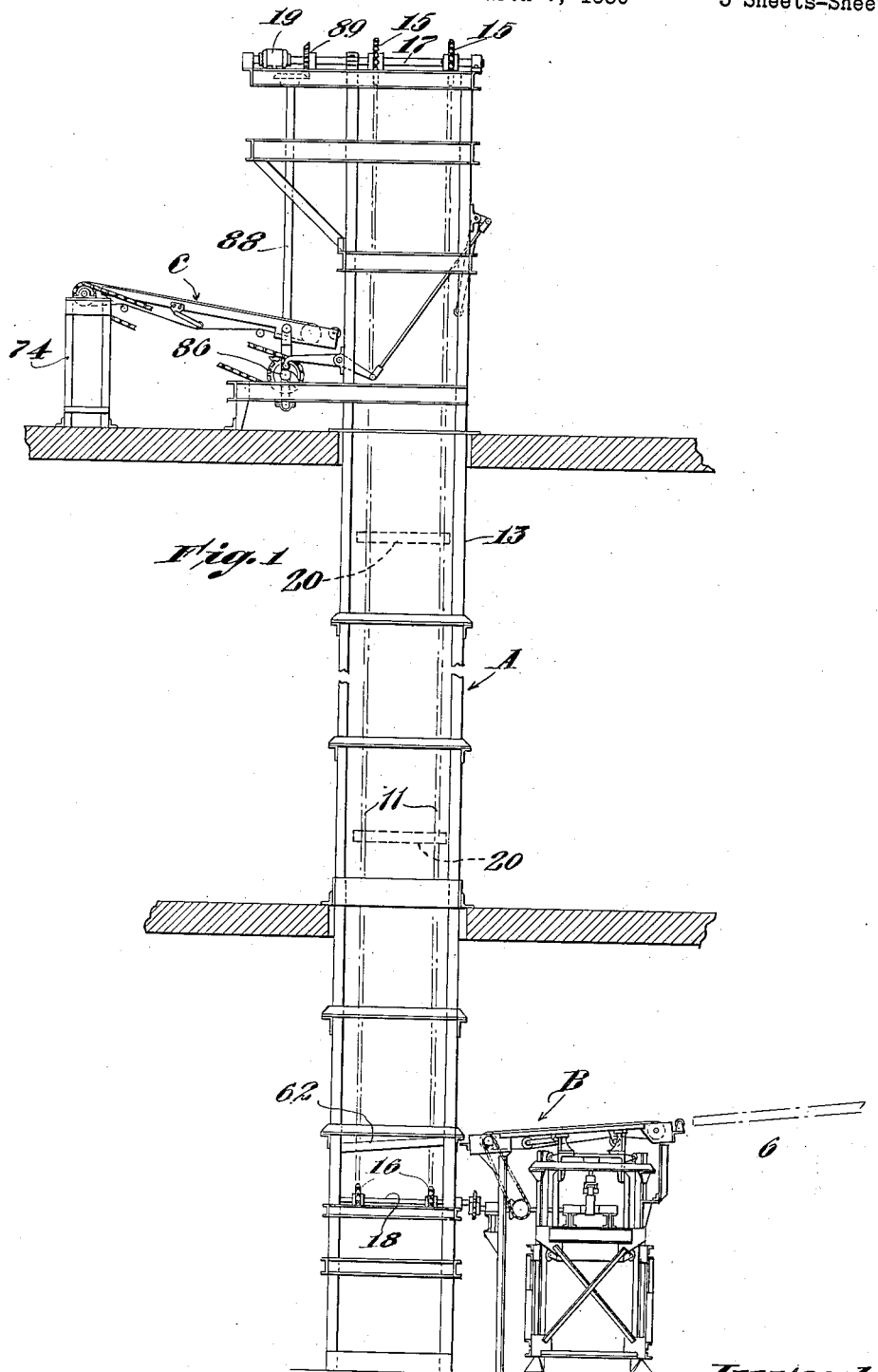
Fig. 1 is a front elevation of a vertical conveyer equipped with loading and unloading mechanisms all constructed in accordance with this invention.

The apparatus herein set forth is a specific embodiment of the invention selected for the purpose of illustration and not of limitation. This embodiment comprises briefly a vertical conveyer A in combination with loading mechanism at station B and unloading mechanism at station C. The conveyer A travels continually and both the loading and unloading operations take place during its upward movement, no such operations taking place during its downward movement.

The vertical conveyer A consists of two pairs of chains 11 and carriers by which loads are transported. The conveyer travels in a well 13 formed of suitable frame members which provide vertically extending parallel guideways. The chains 11 are supported upon sprocket wheels 15 and 16 carried upon transversely extending shafts 17 and 18 respectively. The shafts 17 at the top of the well 13 are drive shafts and the shafts 18 at the bottom of the well are driven shafts. It will be understood that the shafts 17 are geared together in any suitable and well-known manner and are driven by a motor 19 here shown as mounted upon the well 13 and actuating the rear shaft 17.

The carriers comprise flights 20 secured in spaced relations upon the pairs of chains such that, during their upward travel the flights on one pair of chains are in horizontal planes with the flights on the other pair of chains and thus form carriers in which the loads are supported by the flights.

The loading station B comprises a standard 30 and post 31 by which are supported brackets 32 and 33 and inclined angle bars 34 connecting such brackets. On the brackets 32 and 33 are mounted rollers 35 and 36 around which passes a belt 37. The belt 37 is supported intermediate its ends upon idler rolls 38 carried by the angle bars 34. The roller 36 is driven by a chain 39 and sprocket 40 from a source of power to be described later.

Figure 2:
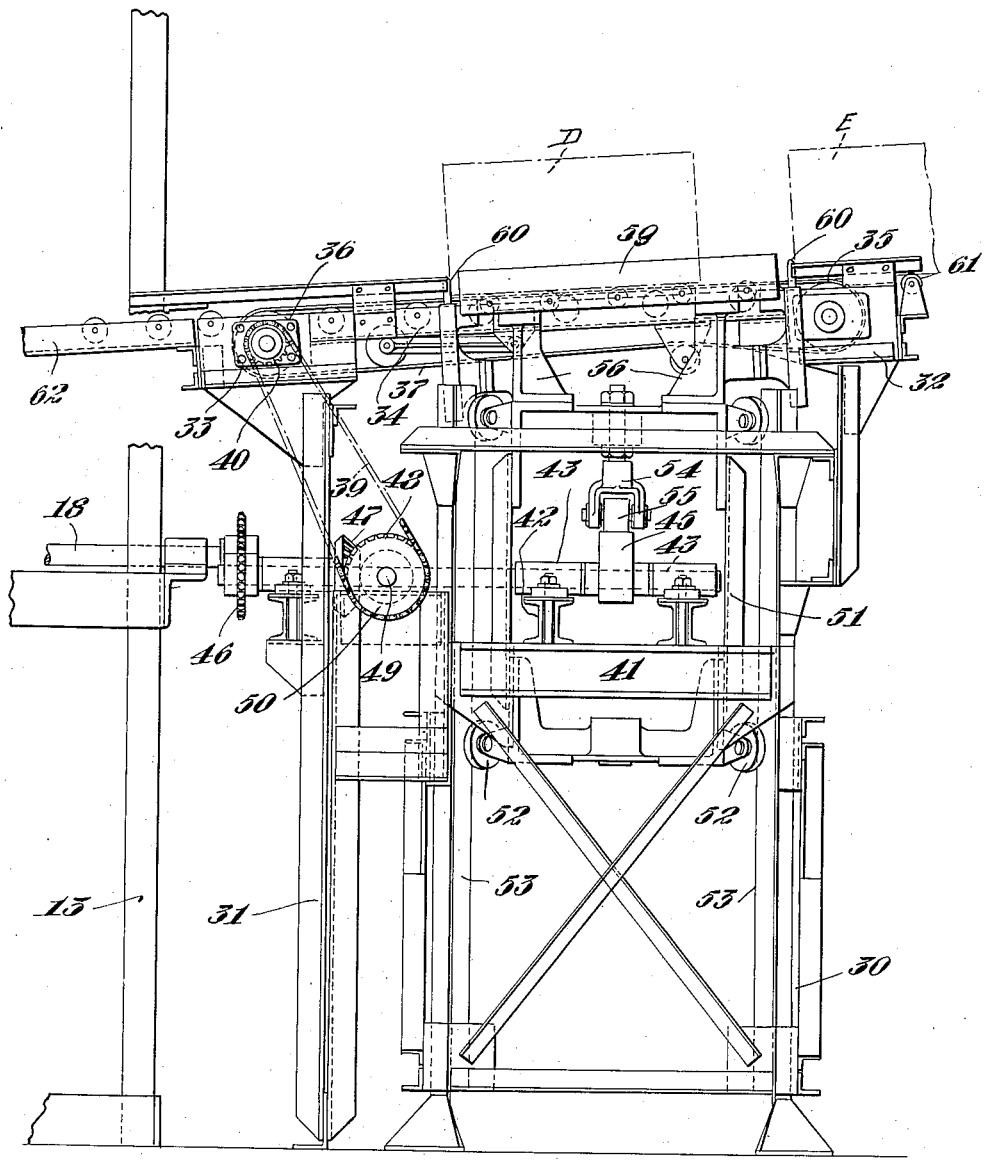
Fig. 2 is an enlarged front elevation of the feeding mechanism associated with the lower end of the conveyer.

Fixed upon the uprights of the standard 30 are cross bars 41 on which rest pillows 42 carrying journals 43 in which is supported a shaft 44. The pillows 42 are spaced as shown in Fig. 2, and mounted on the shaft 44 between the journals 43 is a cam 45. The shaft 44 is rotated by one of the driven shafts 18 through a sprocket and chain connection 46. A bevel gear 47 on the shaft 44 meshes with a bevel gear 48 on a stub shaft 49 which drives the roller 36 through a sprocket 50, the chain 39 and sprocket 40, so that the belt travels in unison with the conveyer A.

Mounted to reciprocate in the standard 30 is a frame 51 guided in its reciprocation by rollers 52, which engage tracks 53 on the uprights of the standard. Depending from the top of the frame is a yoke 54 in which is mounted a roller 55 held by the weight of the frame in contact with the cam 45. Posts 56 on the frame extend at either side of the belt 37 and support inclined strips 57 between which are mounted rollers 58. Guide plates 59 are fixed to the outer strips 57. Carried by each post 56 is a stop pin 60 which projects into the plane of the rollers 58 as clearly shown in Figs. 2 and 3.

At the right of the roller 35, in Figs. 1 and 2, is provided a conveyer 61 of gravity roll or other type in substantial alignment with the belt 37. At the left of the roller 36, in Figs. 1 and 2, is a fixed conveyer 62 here shown as of the gravity roller type which extends across the well 13. The conveyer 62 is so located that the carrier flights 20 pass at either side thereof in their upward travel.

The loading operation will be explained briefly with particular reference to the disclosure in Fig. 2 of the drawings which shows in dotted lines loads in the form of an article D in contact with the forward pair of stop pins 60 and an article E in contact with the rearward pair of stop pins. The depression of the frame 51 in timed relation to the conveyer A releases both articles simultaneously. The article D is lowered upon the belt 37 and advanced thereby onto the conveyer 62 from which it is raised by the flights 20. The article E is advanced by the belt 37, the frame 51 being raised so that the article before reaching the forward stop pins is lifted by the rollers 58 from the belt 37 and completes its travel to the pins by gravity over the rollers while the belt 37 continues its movement below the article.

Attention is called to the fact that the various mechanisms involved in the transfer of the loads to the conveyer are all actuated in timed relation to its travel. One means for attaining this result is the positive operation of these mechanisms from the conveyer operating means and such means have been here disclosed in the illustrative embodiment of the invention. This disclosure is not limitative since, obviously, other means may be employed for this purpose without departing from the spirit and scope of the invention as set forth in the following claims.

We claim:

1. The combination with a vertical conveyer comprising carriers traveling in a well and means for operating the conveyer, of means for feeding articles to the conveyer carriers including two conveying means operable independently, a stop for checking the advance of an article fed by one conveying means, and means for lowering said conveying means and stop to transfer the article while in engagement with the stop to the other conveying means and thereafter free it from such engagement whereby it is advanced to the carriers traveling in the well by the other conveying means.

2. The combination with a vertical conveyer comprising carriers traveling in a well and means for operating the conveyer, of means for feeding articles to the conveyer carriers including two conveying means operable independently, a stop for checking the advance of an article fed by one conveying means, and means actuated by the conveyer operating means for lowering said conveying means and stop to transfer the article, while in engagement with the stop, to the other conveying means and thereafter free it from such engagement whereby it is advanced to the carriers traveling in the well by the other conveying means.

3. Article conveying mechanism comprising two conveying means, one such means extending at opposite sides of the other means, a stop fixed upon and carried by the first-named conveying means, and means for raising and lowering the first-named conveying means and stop relative to the other conveying means, the conveying surfaces of both means being at one point of such movement in the same plane, whereby during such movement an article on one conveying means in engagement with the stop is transferred to the other conveying means while in engagement with the stop and thereafter freed from engagement with the stop.

Signed by us at Syracuse, N. Y., this 21st day of February, 1930.

CHESTER S. JENNINGS.
CHARLES R. LIBBY.